(12) United States Patent
Peckham et al.

(10) Patent No.: US 11,536,878 B2
(45) Date of Patent: *Dec. 27, 2022

(54) DIRECT PROJECTION LIGHT FIELD DISPLAY

(71) Applicant: Avalon Holographies Inc., St. John's (CA)

(72) Inventors: Jordan Peckham, St. Phillips (CA); Daniel Webber, St. John's (CA)

(73) Assignee: Avalon Holographies Inc., St. John's (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/363,230

(22) Filed: Jun. 30, 2021

(65) Prior Publication Data

US 2021/0325573 A1      Oct. 21, 2021

Related U.S. Application Data

(63) Continuation of application No. 16/433,303, filed on Jun. 6, 2019, now Pat. No. 11,119,253.

(60) Provisional application No. 62/738,307, filed on Sep. 28, 2018.

(51) Int. Cl.
    *G02B 3/00*      (2006.01)
(52) U.S. Cl.
    CPC .................... *G02B 3/0062* (2013.01)
(58) Field of Classification Search
    CPC .............................. G02B 3/0062; G02B 3/005
    See application file for complete search history.

(56) References Cited

U.S. PATENT DOCUMENTS

| 2005/0237622 A1* | 10/2005 | Yoshino ................. G02B 30/24 |
| | | 359/618 |
| 2008/0309754 A1 | 12/2008 | Nayar |
| 2013/0194458 A1 | 8/2013 | Nayar |
| 2017/0309049 A1 | 10/2017 | Law et al. |
| 2019/0052866 A1 | 2/2019 | Chang |

FOREIGN PATENT DOCUMENTS

| JP | 2000298293 A | 10/2000 |
| JP | 2017062295 A | 3/2017 |

OTHER PUBLICATIONS

Watanabe, Hayato et al., IS&T International Symposium on Electronic Imaging 2018, Society for Imaging Science and Technology, Stereoscopic Displays and Appplications XXIX, Jan. 28, 2018.
Zhou, Zhong et al., Light Field Projection for Lighting Reproduction, IEEE Virtual Reality Conference Mar. 23-27, 2015.

(Continued)

*Primary Examiner* — Andrew J Coughlin

(57) ABSTRACT

A direct projection light field display comprising an array of projectors for direct projection of a light field. The overall design and incorporation of additional optics achieve the optimal light distribution and small pixel size to produce a high definition, 3D display. The architecture of the direct projection light field display has low a brightness requirement for each projector, resulting in an increased projector density, decreased system, and a decreased power requirement, while producing a high-definition light field.

17 Claims, 9 Drawing Sheets

(56) References Cited

OTHER PUBLICATIONS

"What is Pixel Pitch and Why Does it Matter?", published in blog of PLANAR, a Leyard company on Feb. 23, 2018.
Geng, J. (Nov. 22, 2013). Three-dimensional display technologies. Rockville, MD: IEEE Intelligent Transportation Systems Society.
Jeong, J.J., Lee, J.H., Cho, Y.H., Nam, D., Park, D.S., & Kuo, C.C.J. (Oct. 2015). Efficient light-field rendering using depth maps for 100-Mpixel multi-projection 3D display. Journal of Display Technology, vol. 11, No. 10.
Jones, A., Nagano, K., Liu, J., Busch, J., Yu, X., Bolas, M., & Debevec, P. (2014). Interpolating vertical parallax for an autostereoscopic 3D projector array. Journal of Electronic Imaging.
Jones, A., McDowall, I., Yamada, H., Bolas, M., & Debevec, P. Rendering for an interactive 360° light field display. (2007). San Diego, CA. ACM SIGGRAPH 2007 Papers.
Jurik, J., Jones, A., Bolas, & M., Debevec, P. (Oct. 2011). Prototyping a light field display involving direct observation of a video projector array. Colorado Springs, CO. CVPR 2011 Workshops, pp. 15-20.
Lee, J.H., Park, J., Nam, Choi, S. Y., Park, D.S., & Kim, C.Y. (2013) Optimal projector configuration design for 300-Mpixel multi-projection 3D display. Opt. Express vol. 21, Issue 22. 26820-26835.
Understanding Focal Length and Field of View. Edmund Optics. Retrieved from https://www.edmundoptics.com/resources/application-notes/imaging/understanding-focal-length-and-field-of-view/.

* cited by examiner

DIRECT PROJECTION LIGHT FIELD DISPLAY

CLAIM OF PRIORITY

This application is a continuation of and claims priority to U.S. patent application Ser. No. 16/433,303 filed on Jun. 6, 2019, which claims priority to U.S. Patent Application Ser. No. 62/738,307, filed on Sep. 28, 2018, the contents of both of which are incorporated here by reference in their entirety.

BACKGROUND

Three dimensional displays allow the viewer to gain a broader perspective on the image they are viewing. Some three-dimensional displays use polarized light and require the viewer to wear specialized glasses. Others use direct projection and produce an image that provides some parallax in a single dimension.

SUMMARY

The present disclosure relates to an array of projectors for direct projection of a light field with a fixed set of elemental images. The direct projection method yields many benefits in the overall design, including decreased system depth, a direct pixel to number of views relationship, and a decreased brightness requirement per projector.

According to an aspect there is a light field display including:
  i. a projector array including a plurality of light projectors, wherein each projector is configured to generate light rays;
  ii. a plurality of lens systems configured to cause the light rays generated by the projector array to create a light field, wherein the plurality of lens systems includes:
    a. a first lens system including an array of lenslets, the first lens system being positioned to receive the light rays from the projector array; and
    b. A second lens system including microarray lenslets, the second lens system being positioned to receive a diffused, collimated beam from the first lens system, wherein light output from the microarray lenslets forms the light field.

Embodiments can include one or more of the following features.

In an embodiment of the light field display, each lenslet of the first lens system is positioned to receive light from a corresponding one of projectors in the projector array.

In an embodiment of the light field display, the first lens system includes a first lens subsystem and a second lens subsystem, wherein the second lens subsystem is positioned between the first lens subsystem and the second lens system, the second lens subsystem being positioned to receive light from the first lens subsystem and the second lens system being positioned to receive the diffused, collimated beam from the second lens subsystem.

In an embodiment of the light field display, the second lens subsystem includes a diffusing array.

In an embodiment of the light field display, the diffusing array is positioned to receive a collimated beam from one or more of the lenslets of the first lens subsystem In an embodiment of the light field display, the first lens system includes an array of collimating lenslets.

In an embodiment of the light field display, the diffused, collimated beam received by the second lens system is diffused according to a point spread function.

In an embodiment of the light field display, the point spread function is described by a Gaussian function with a Full-Width at Half Maximum (FWHM) characterized by one or more parameters of the light field display.

In an embodiment of the light field display, the one or more parameters of the light field display comprise one or more of:
  i. a hogel pitch;
  ii. a pixel pitch; and
  iii. a focal length of the second lens system.

In an embodiment of the light field display, the projector array includes an adjustment element for adjustment of a direction of each projector.

In an embodiment of the light field display, including a housing, wherein the projector array and plurality of lens systems are arranged in the housing.

According to an aspect there is a method for creating a light field including:
  i. generating light rays by each of multiple projectors of a projector array;
  ii. rendering the light rays generated by the projector array into a light field image, including:
    a. by a first lens system including an array of lenslets, collimating the light rays generated by the projector array to form a collimated beam;
    b. by a second lens system including microarray lenslets, rendering the diffused, collimated beam into a light field.

Embodiments can include one or more of the following features.

In an embodiment of the method, light emitted from a corresponding one lenslets of the first array of microarray lenslets is received at a diffusing array.

In an embodiment of the method, diffused light emitted from the diffuser array is characterized by a point spread function.

In an embodiment of the method, the point spread function is described by a Gaussian function with a Full-Width at Half Maximum (FWHM) characterized by one or more parameters of a light field display.

In an embodiment of the method, the direction of each of one or more of the projectors of the projector array is adjusted.

The approaches described here can have one or more of the following advantages. The light field display can be an autostereoscopic display that can have a wide field-of-view and high angular resolution. The light field display can allow for both horizontal and vertical parallax. The light field display can have relatively low power consumption. The reduced pixel size produces a light field display meant to replicate a natural, "real life" image with high resolution.

The details of one or more implementations are set forth in the accompanying drawings and the description below. Other features and advantages will be apparent from the description and drawings, and from the claims.

DETAILED DESCRIPTION

We describe here a multiple-view, autostereoscopic, and high-angular resolution, light field display. The light field display is viewable with both horizontal and vertical parallax.

The concept of an observer-based function based on light in space and time, or plenoptic function was developed to describe visual stimulation perceived by vision systems. The basic variables of the plenoptic function are dependent upon include the 3D coordinates (x,y,z) from which light is being viewed and the direction light approaches this viewing location, described by the angles ($\theta$, $\phi$). With wavelength of the light, $\Delta$ and time of the observation, t, this results in the plenoptic function:

$$P(x,y,z,\theta,\phi,\lambda,t)$$

Alternative to the plenoptic function, one may use radiance along light rays in 3D space at a point and given direction may be represented by a light field. The definition of light field may be equivalent to that of the plenoptic function. A light field may be described as radiance flowing through all points in all possible directions, as a 5D function. For a static light field, the light field may be represented as a scalar function:

$$L(x,y,z,\theta,\phi)$$

Where (x,y,z) represent the radiance as a function of location and the light direction of travel is characterized by ($\theta$, $\phi$). A viewer of a 3D real world object is subject to infinite views, or a continuously distributed light field. To practically replicate this, the present disclosure describes a direct projection light field display to subsample the continuously distributed light field into a finite number of views, or multiple views, to approximate the light field. The output of the direct projection light field display is a light field, a 3D representation of a continuously distributed light field based upon a finite number of views with angular resolution exceeding that of the human eye.

Figure 1:
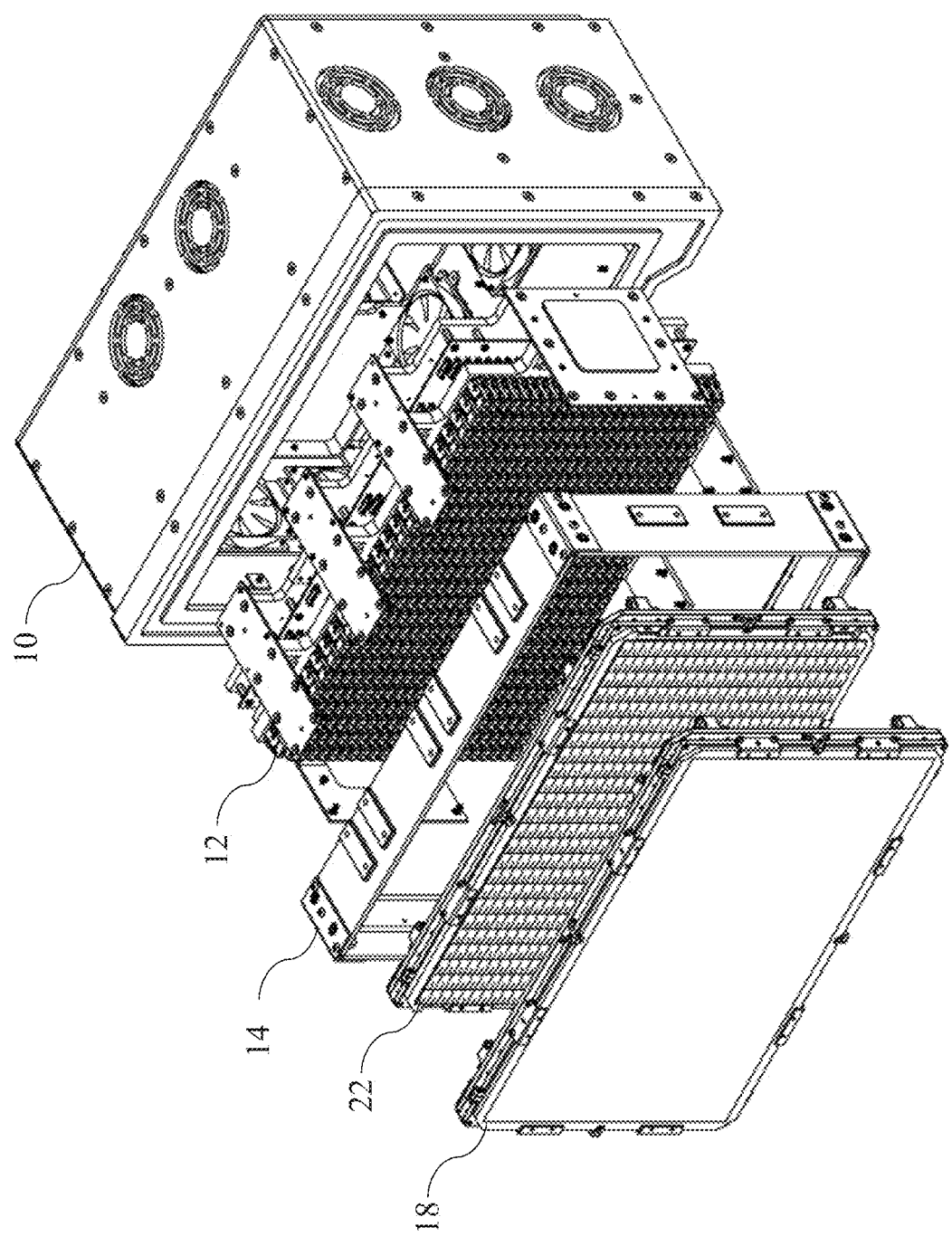
FIG. 1 is an exploded diagram of a light field display.

Projector array-based displays can be difficult to design, e.g., due to the inclusion of many densely-oriented projectors with precise alignment. Referring to FIG. 1, a light field display includes an enclosure 10 that houses a projector array 12 and two lens arrays 16, 18. The projector array 12 includes multiple projectors, each of which produces light. The projectors in the projector array may be pico-projectors, specialized for augmented reality headsets or automotive heads-up displays (HUDs). The projectors receive image data and convert the image data into projected light. Projected light is then transmitted from the projectors to a first lens system or array 16. The light is then transferred from the first lens system 16 to a second lens system 18 which forms a light field image. All optomechanical components fit within the lens enclosure 14.

Generally, very high-brightness projectors are required for light field displays known in the art. An advantage of the light field displays of the present disclosure is the reduced brightness requirement for the projectors in the projector array 12. The decreased brightness requirement is achieved through the design of the direct projection display's lens systems' ability to control the angular distribution of light and application of a point spread function to the light beam. The decreased brightness requirement for the projector array 12 may allow for small LEDs without an internal cooling requirement, therefore a smaller projector footprint may lead to a tighter packing density of the projector array 12, decreased size and weight of the individual projectors, and decreased power requirements for the direct projection light field display.

The first lens subsystem 16, which can be a collimating array, reduces the divergence of light emitted from the projector array 12. The first lens subsystem 16 is positioned a throw-distance from the projector array 12. In one instance, the throw distance is such that each pixel of the projector image increases in size proportional to the adjacent pixel, and results in no overlap in the pixels. The projector is placed such that the distance between the projector and the first lens subsystem 16 creates a projected image equal in size to a single lenslet in the first lens subsystem 16. The divergent pattern from the projector array 12 is approximately the same size as a single projector, allowing a 1:1 ratio between collimating array lenslets of the first lens subsystem 16 and projectors 12.

Figure 2:
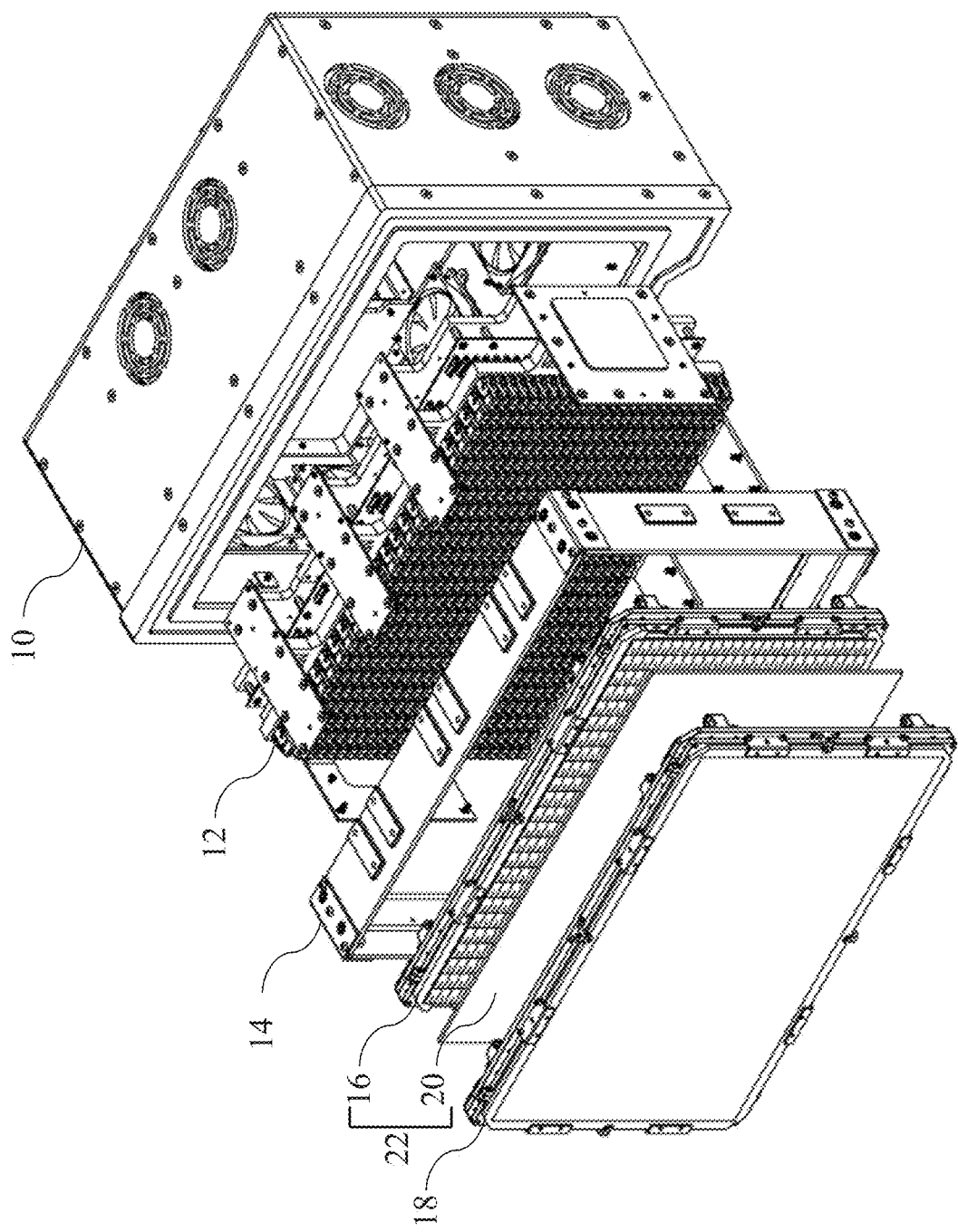
FIG. 2 is an exploded diagram of an exemplary embodiment of a light field display.

FIG. 2 illustrates a light field display. A collimated light beam leaving the first lens system 22, which includes a first lens subsystem 16 and a second lens subsystem 20, the second lens subsystem 20 can be an engineered diffuser array. The second lens subsystem 20 is positioned between the first lens subsystem 16 and the second lens system 18, the second lens subsystem 20 and receives light from the first lens subsystem 16. The first and second lens subsystems 16,20 can be a single integrated piece, or separate. The second lens system 18 can be positioned to receive a diffused, collimated beam from the second lens subsystem 20. Therefore, light from the first lens subsystem or collimating array 16 travels to the second lens subsystem or diffusing array 20 which in one example is an engineered diffuser array. The output of the projector 12 is collimated to preserve the projected size of the image.

Figure 5:
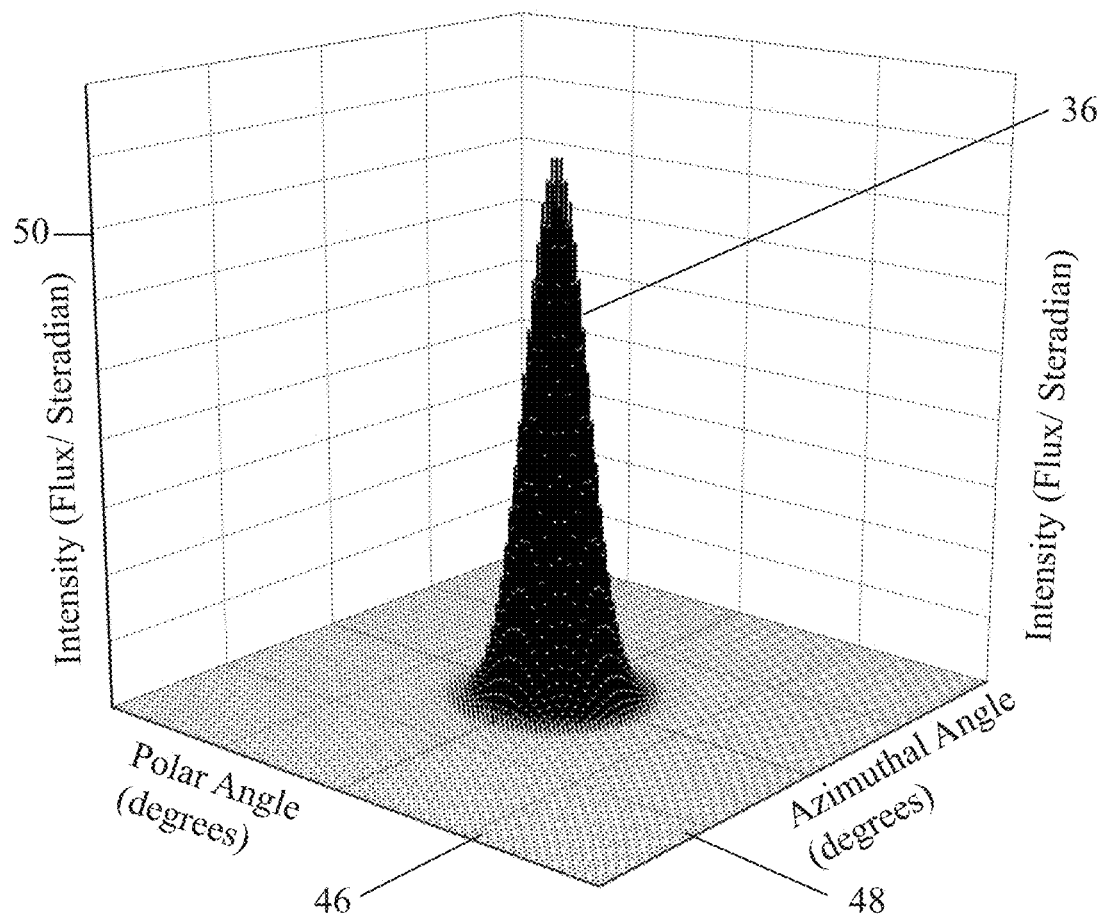
FIG. 5 is a diagram of a point spread function for a pixel in an engineered diffuser array.

At the second lens subsystem 20, the divergence of each pixel is increased by a factor of:

$$\sqrt{C^2 \cdot f_m^2}$$

where C is a constant that is chosen for proper reconstruction of the sampled wavefront and $f_m$ is a fill factor. In one example, the value of C is approximately 2. In such instances the fill factor, $f_m$, is approximately 0.9, such that the spot size, $x_s$, is related to the pixel spacing, $x_p$, as $$x_s = x_p \cdot \sqrt{C^2 \cdot f_m^2}$$

where $x_p$ is the lens pitch divided by the number of angular samples. Therefore, the second lens subsystem or diffusing array 20 imparts a point spread function on each pixel in the image. FIG. 5 illustrates a plan view image of said point spread function.

The pixels with the point spread function from the second lens subsystem or diffusing array 20 are then incident on the back surface of the second lens system 18, which constitutes the display lens. The distance between the second lens system 18 and second lens subsystem 20 will allow for fine tuning of the output width of the pixels per image and may be minimized to reduce system space.

As the light is incident on and passes through the first lens subsystem or engineered diffuser array 20, the light is dispersed according to a point spread function, approximated as a Gaussian function. A second lens subsystem may include an angular diffuser or engineered diffusing array 20 which is used to achieve a desired angle and prevent bleed from the projection of light from neighboring projectors 12. In one instance of the present disclosure, a specific point spread function is applied to the light from each individual projector pixel, directing the pixel to a specific angle. One projector and its pixels can create a small image.

For example, it may be observed that each projector creates an image of 26 mm x1 5 mm at a distance defined by the throw ratio of the projector. This image may then be projected to a first lens subsystem or collimation lens 16, resulting in a packet image that is that exact size (26 mm×15 mm) projected toward a second lens subsystem consisting of a diffuser screen or engineering diffuser array 20. The second lens subsystem 20 can then create a small, defined point spread function. Using the desired point spread function, proper overlap between pixels is achieved to reduce resolution bias error, or the picket fence effect and distribute the light for a better viewing experience. Resolution bias error references missing information between samples in a spectrum. The reduction of the resolution bias error allows for smooth viewing zone transitions. The second lens subsystem 20 in this instance is designed to a very specific angular output such that if, for example, the engineered divergence has a 5-degree circular FWHM (Full Width Half Maximum), the beam through the lens system will also have an intensity profile of 5 degrees. This output is the light directed to the display lens 18 and which can be a metasurface, gradient index lens material, or any alternate optical structure to distribute light from each pixel according to a plenoptic sampling function as described above.

Each projector 12 may be aligned such that light exiting the first lens system 22 strikes normal to the second lens system 18. As such, each projector 12 may be equipped with alignment hardware and fine control. Depending on the tolerances necessary, there are several approaches to projector 12 alignment:

Adjustment element, i.e., mechanical mounts, with screw adjusters to provide one-time rough alignment.

Piezoelectric Transducers for nano to micro scale electronic adjustment. Potentially useful for active calibration schemes utilizing feedback.

Adjustment elements may include kinematic mounts and/or digitally controlled adjustment elements such as the above-mentioned piezoelectric transducers.

The maximum amount of adjustment is dictated by the dimensions of the lenslets illuminated by each projector 12.

Figure 3A:
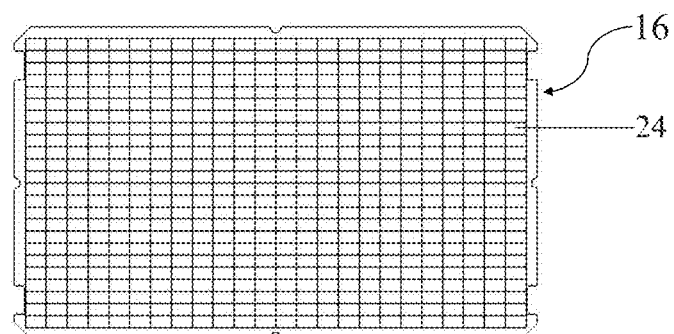
FIG. 3A is a front diagram of a collimating lens array.
Figure 3B:
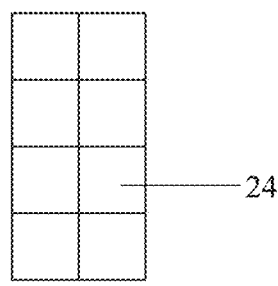
FIG. 3B is a diagram of a magnified view of a 2×4 grid of a collimating lens array in FIG. 3A.
Figure 3C:
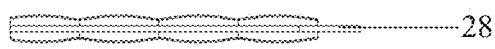
FIG. 3C is diagram of a profile view of a collimating lens array FIG. 3A.
Figure 3D:
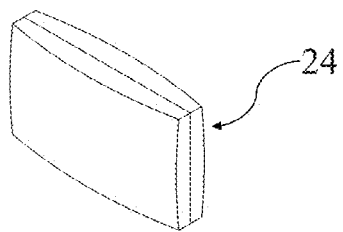
FIG. 3D is diagram of an isometric view of a single lens in a collimating lens array FIG. 3A.

FIG. 3A shows an example of a first lens subsystem or collimating lens array 16. In some examples, the first lens subsystem collimating lens array 16 may be generally rectangular, with a plurality of collimating lenslets 24, as shown in FIG. 3D. The first lens subsystem 16 may be constructed using a substrate 28 adhered to a plurality of small lenses to form a single piece fixed to the substrate using an optically clear adhesive with a specific refractive index or an optically clear tape, to form the first lens subsystem as an array of collimating lenslets 16. The substrate may be cyclic olefin copolymer (COC), glass, cyclic olefin polymer (COP), PMMA, polycarbonate, polystyrene, isoplast, zeonex, optical polyester, acrylic, polyetherimide (PEI), among other things.

Each collimating lenslet 24 may be positioned to align with a corresponding projector in the projector array such that each collimating lenslet 24 receives light from its corresponding projector. The first lens subsystem collimating lens array 16 may be coated on one or both sides with an anti-reflective coating.

FIG. 3D depicts a single collimating lenslet 24 in the first lens system collimating array 16. In the example of FIG. 3B, the collimating lenslet 24 includes two plano-convex lenses and a substrate 28. The convex lenses may be formed of, e.g., Zeonex® E48R, glass, cyclic olefin polymer (COP), PMMA, polystyrene, isoplast, optical polyester, acrylic, polyetherimide (PEI), or other suitable materials. The two plano-convex lenses and substrate 28 can be arranged to form a single bi-aspherical convex lens, which can act as a collimating lenslet 24.

Figure 4A:
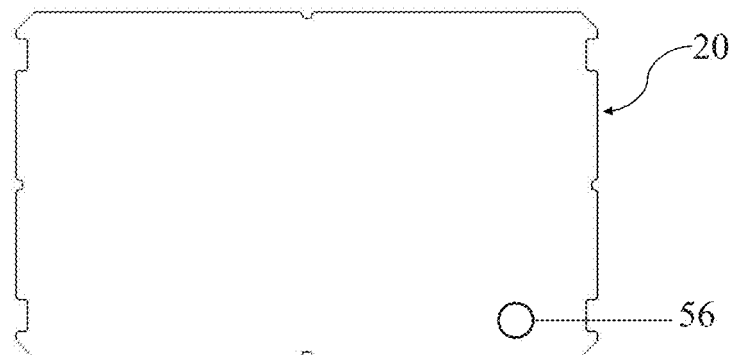
FIG. 4A is a front diagram of an engineered diffuser.
Figure 4B:
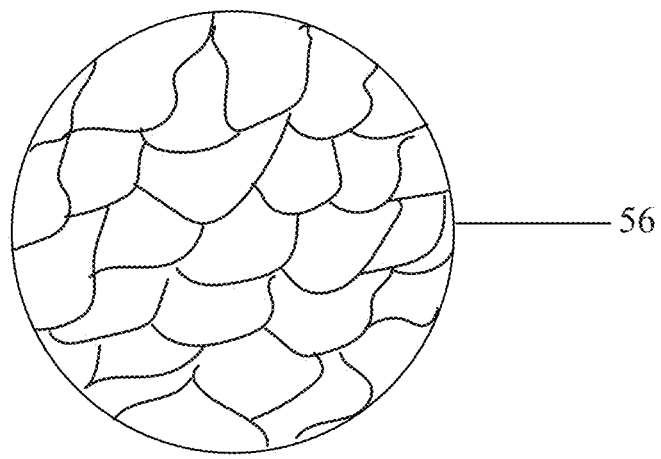
FIG. 4B is a magnified diagram of a laser etched engineered diffuser.
Figure 4C:
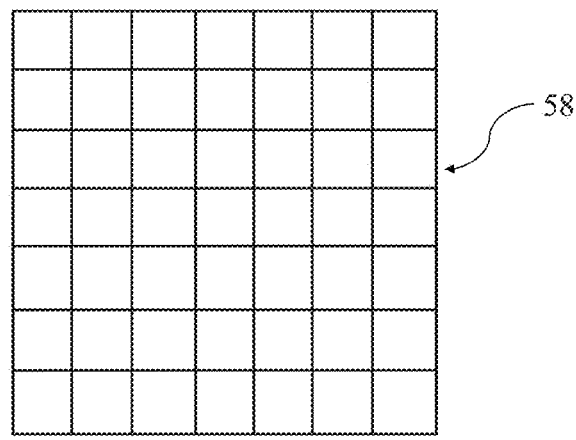
FIG. 4C is a magnified diagram of a diffuser lens array.

FIG. 4A illustrates a second lens subsystem or engineered diffuser array 20. In some examples, the second lens subsystem 20 is a laser etched engineered diffuser 56 as shown in FIG. 4B. In some examples, the second lens subsystem 20 is a diffuser lens array 58 as shown in FIG. 4C. In one implementation of the present disclosure, the second lens subsystem 20 has a circular angle of 3.5 degrees and does not require coating.

FIG. 5 depicts a nominal point spread function according to an embodiment of the disclosure for a lenslet in the second lens subsystem 20. In an example, the point spread function 36 may have a Full-Width at Half Maximum (FWHM) of twice the angle between two directional pixels. FIG. 5 illustrates a graphical representation of the angular spread of a pixel in terms of the azimuthal angle 48 and the polar angle 46 versus intensity 50 of a light ray as function of the second lens subsystem 20.

First, the light is emitted from the projector 12, characterized by a specified throw ratio, where each pixel of the projector image increases in size proportional to the adjacent pixel, resulting in no overlap in the pixels. The projector 12 is placed such that the distance between the projector and the first lens subsystem collimating lens array 16 creates a projected image equal in size to the number of lenslets 18 the projector 12 is illuminating.

Subsequently, at the first lens subsystem 16, the output of the projector is collimated to preserve the projected size of the image. The collimated beam is then incident on the second lens subsystem 20, where the width of the beam is approximately equal on both lens systems 16, 20.

Finally, the pixels with the point spread function 36 from the second lens subsystem 20 are then incident on the back surface of the microlens array, which constitutes the display lens 18. The distance between the display 18 and the second lens subsystem 20 will allow for fine tuning of the output width of the pixels per image.

Figure 6A:
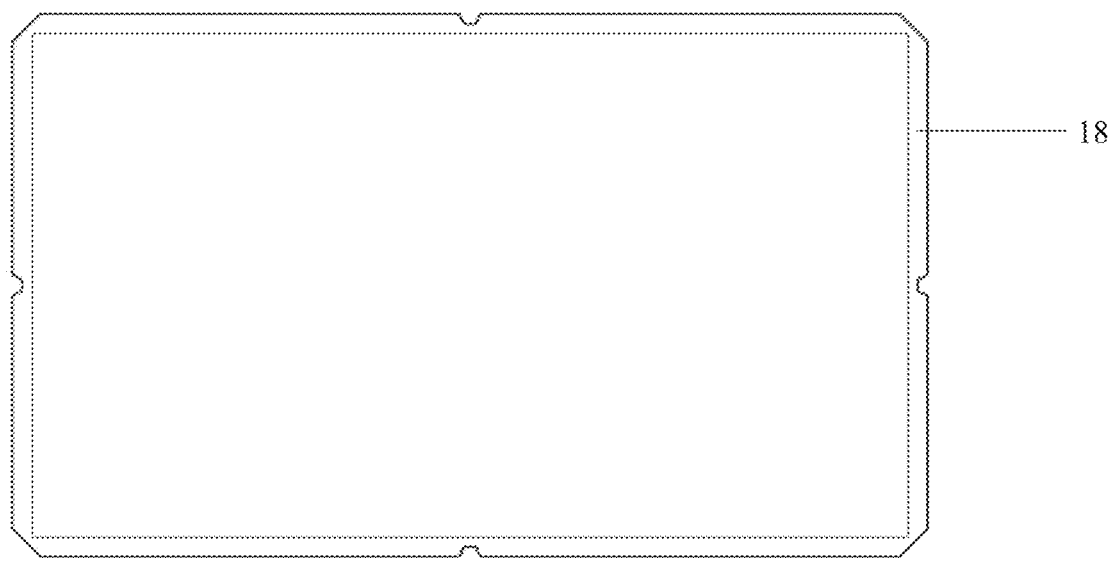
FIG. 6A is a diagram of a display lens array.
Figure 6B:
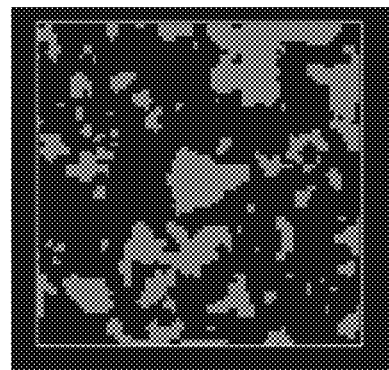
FIG. 6B is a diagram of a magnified view of a metasurface display lens.
Figure 6C:
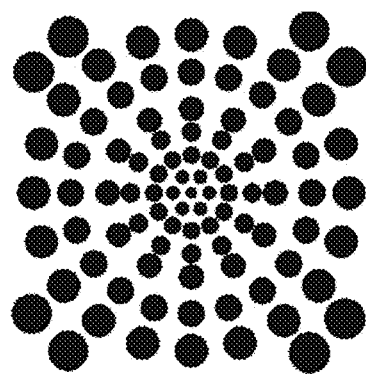
FIG. 6C is a diagram of a magnified view of a metasurface display lens.

FIG. 6A illustrates a display lens system 18. The display lens system 18 may consist of a metasurface as shown in FIG. 6B or a metamaterial-based lens as shown in FIG. 6C.

Figure 7A:
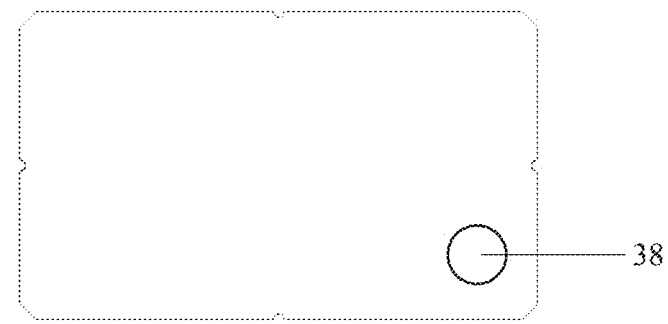
FIG. 7A is a front diagram of the horizontal lenticular portions of a display lens array.
Figure 7B:
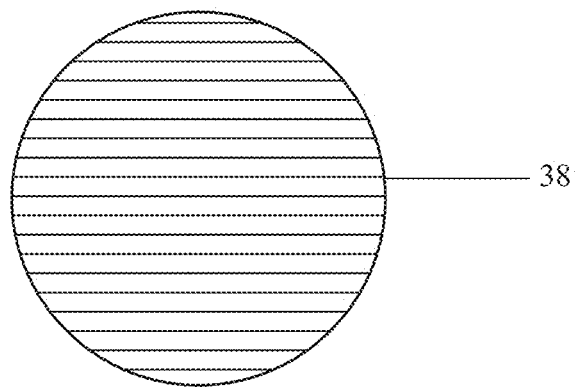
FIG. 7B is a diagram of a magnified view of the horizontal lenticular portions of a display lens array in FIG. 7A.
Figure 7C:
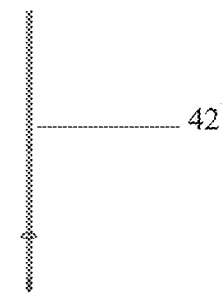
FIG. 7C is a diagram of a profile view of the horizontal lenticular portions of a display lens array shown in FIG. 7A.
Figure 7D:
FIG. 7D is a diagram of a magnified view of the profile view of the horizontal lenticular portions of a display lens array in FIG. 7A.
Figure 7E:
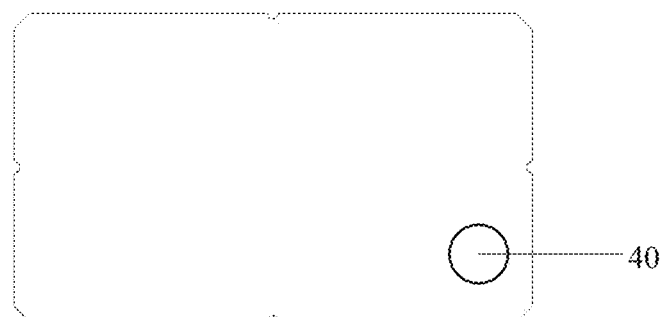
FIG. 7E is a front diagram of the vertical lenticular portions of a display lens array.
Figure 7F:
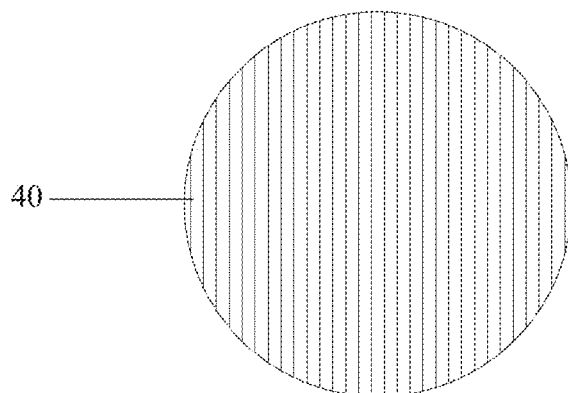
FIG. 7F is a diagram of a magnified view of the vertical lenticular portions of a display lens array in FIG. 7A.
Figure 7G:
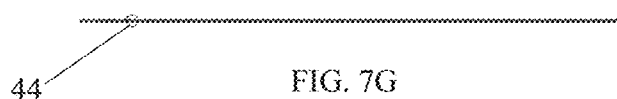
FIG. 7G is a diagram of a profile view of the vertical lenticular portions of a display lens array shown in FIG. 7A.
Figure 7H:
FIG. 7H is a diagram of a magnified view of the profile view of the vertical lenticular portions of a display lens array in FIG. 7A.

In some examples, as shown in FIGS. 7A and 7B, the second lens system includes a horizontal lenticular portion 38 and a vertical lenticular portion 40. FIG. 7A also illustrates the profile view 42 of the horizontal lenticular portion 38. FIG. 7B also illustrates the profile view 44 of the vertical lenticular portion 40. The horizontal and vertical potions may be stacked such that the light leaving the second lens subsystem 20 passes serially through each portion.

Figure 8:
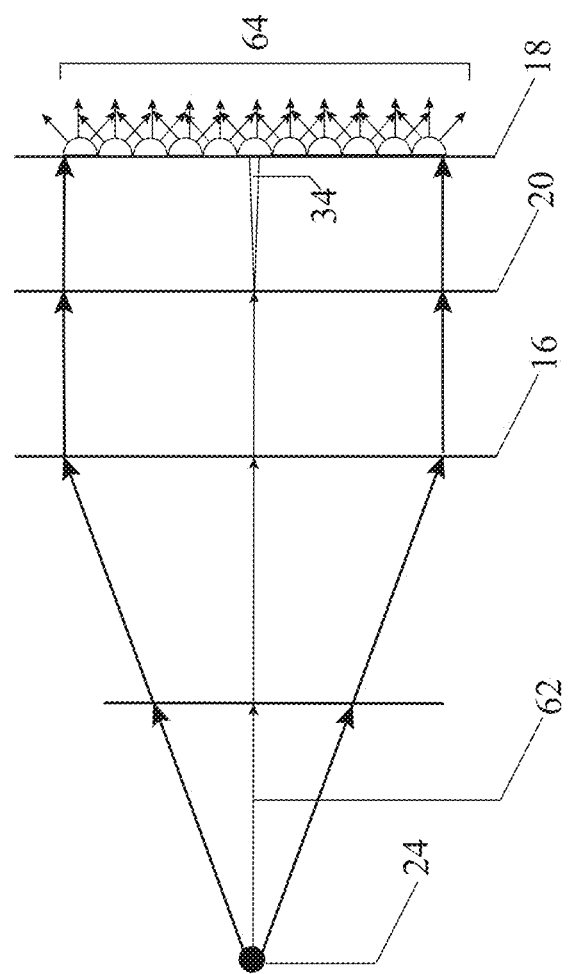
FIG. 8 is a diagram illustrating the ray path of a pixel from a single projector through a direct projection light field display.

FIG. 8 illustrates the ray path from a single projector 12 in a direct projection light field display. A sample ray path of a single pixel 62 travelling from a single projector 12 to a first lens system 16. A collimated light beam leaves the first lens system 16 to a second lens subsystem 20, the second lens subsystem can be an engineered diffuser array 20. A point spread function is applied to the ray from a single pixel 62 as it passes through the second lens subsystem 20 creating a diffused collimated light beam 36. The diffused collimated light beam passes through a display lens 18, resulting in a light field 64.

As used herein, one or more parameters of the light field display comprise one or more of: hogel pitch, a pixel pitch, and focal length. The term pixel references a set of red, green, and blue subpixels. The pixel pitch is defined as the distance from the center of one pixel to the center of the next. As used herein, a pixel array refers to an array of pixels inside a hogel. A hogel is an alternative term for a holographic pixel, which is a cluster of traditional pixels with directional control. An array of hogels can generate a light field. It then follows that the hogel pitch is defined as the distance from the center of one hogel to the center of an adjacent hogel. The angular field of view for a lens is defined by its focal length. Generally, a shorter focal length results in a wider field of view. It should be noted that the focal length is measured from the rear principal plane of a lens. The rear principal plane of lens is rarely located at the mechanical back of an imaging lens. Due to this, approximations and the mechanical design of a system are generally calculated using computer simulation.

A number of embodiments have been described. Nevertheless, it will be understood that various modifications may be made without departing from the spirit and scope of the invention. For example, some of the steps described above may be order independent, and thus can be performed in an order different from that described.

Other implementations are also within the scope of the following claims.

We claim:

1. A light field display comprising:
an array of light projectors, each projector emitting light from a pixel along a ray path;
a first lens system comprising:
a first lens subsystem comprising a collimating array; and
a second lens subsystem comprising a diffusing array, and
a second lens system comprising a display lens,
wherein light output from the display lens forms the light field.

2. The light field display of claim 1, wherein the collimating array in the first lens subsystem is an array of collimating lenslets.

3. The light field display of claim 1, wherein the second lens system is positioned to receive a diffused, collimated beam from the first lens system.

4. The light field display of claim 1, wherein the collimating array reduces divergence of the light output emitted from the projector array.

5. The light field display of claim 1, wherein the light output from the first lens subsystem is collimated.

6. The light field display of claim 1, wherein each projector is positioned at a distance to the first lens subsystem to create a projected image equal in size to a single lenslet in the first lens subsystem.

7. The light field display of claim 1, wherein the diffusing array imparts a point spread function on each pixel in the image.

8. The light field display of claim 7, wherein the point spread function directs each pixel to a specific angle.

9. The light field display of claim 7, wherein the point spread function is described by a Gaussian function with a Full-Width at Half Maximum characterized by one or more parameters of the light field display.

10. The light field display of claim 1, wherein the diffusing array in the second lens subsystem is a diffuser screen or an engineered diffuser array.

11. The light field display of claim 1, wherein the diffusing array in the second lens subsystem has a circular Full Width Half Maximum at an angle equivalent to an intensity profile of a light output beam through the lens system.

12. The light field display of claim 1, wherein the display lens in the second lens system is a microlens array.

13. The light field display of claim 1, wherein the display lens comprises a metasurface or gradient index lens material.

14. The light field display of claim 1, wherein the display lens comprises an optical structure to distribute light from each pixel in each projector according to a plenoptic sampling function.

15. The light field display of claim 1, wherein the one or more parameters of the light field display comprise one or more of a hogel pitch, a pixel pitch, and a focal length of the second lens system.

16. The light field display of claim 1, wherein each projector in the array of light projectors comprises an adjustment element for adjustment of a direction of each projector.

17. The light field display of claim 1, further comprising a housing, wherein the projector array and plurality of lens systems are arranged in the housing.

\* \* \* \* \*